United States Patent

[11] 3,616,109

[72] Inventors Frank Miro
Huntington Station, N.Y.;
Beverly M. Eagon, Scranton; Seth Wheeler, Clark-Summit, Pa.
[21] Appl. No. 834,361
[22] Filed June 18, 1969
[45] Patented Oct. 26, 1971
[73] Assignee Fitchburg Coated Products Inc.
Moosic, Pa.

[54] SPLICE FOR PRESSURE-SENSITIVE ADHESIVE STOCK
4 Claims, 5 Drawing Figs.
[52] U.S. Cl. .................................................... 161/36,
161/145, 161/167, 161/116, 161/406
[51] Int. Cl. ........................................................ B32b 3/10
[50] Field of Search ........................................... 161/37, 36,
38–40, 145, 406, 116, 167

[56] References Cited
UNITED STATES PATENTS

| | | | |
|---|---|---|---|
| 1,730,929 | 10/1929 | Flynn .......................... | 161/38 |
| 2,506,915 | 5/1950 | Bishop........................ | 161/39 |
| 3,135,642 | 6/1964 | Ruffer ......................... | 161/145 |
| 3,224,566 | 12/1965 | Elliott.......................... | 161/36 |
| 3,411,978 | 11/1968 | Frohbach et al.............. | 161/38 |

Primary Examiner—Morris Sussman
Attorneys—Norman Friedman, Stephen E. Feldman, Morris I. Pollack, Arthur T. Groeninger and Philip Furgang ABSTRACT: A slice for pressure-sensitive label stock including an insert member sandwiched between the adhesive and the release coat of the stocks to be joined. Splicing tapes are used to join the two sections of stock while the insert member prevents the tapes from fusing in the edge areas where the two stocks do not perfectly abut. The insert member includes at least two layers with at least one of the layers releasably adhered to the release coat thereby permitting ready removal of the matrix formed after diecutting labels from the stock.

PATENTED OCT 26 1971 3,616,109

INVENTORS
SETH WHEELER
BEVERLY M. EAGON
FRANK MIRO

BY
ATTORNEY

SPLICE FOR PRESSURE-SENSITIVE ADHESIVE STOCK

BACKGROUND OF THE INVENTION

In the diecutting pressure-sensitive adhesive label stock so as to form labels, it is often necessary to cut out portions of the roll of the stock due to defects in the material. As a result of this cut, the stock has to be spliced together so that a continuous roll is available for continued processing.

In the past, splicing has been accomplished by abutting the edges of the stock to be joined and applying splicing tapes above and below the abutting edges. A problem with this technique is that the tapes fuse if edges of the stock do not perfectly abut. As a result, after diecutting labels from the stock, the unused portions of the label layer can not be separated from the release backing in the spliced area without the web tending to snap.

SUMMARY OF THE INVENTION

The splice of the present invention comprises an insert member having end portions which are sandwiched between the adhesive and the release coat of the stocks to be joined. Splicing tapes are applied above and below the joined areas of stock. The insert member prevents the splicing tapes from fusing.

The insert member is formed by casting a film-forming material on a substrate from which the film can be readily removed by stripping. The strippable film faces the release coat on the release backing and adheres to the splicing tapes extending across the release backing. The substrate of the insert member faces the adhesive on the label stock and adheres thereto.

The removing of the matrix formed after diecutting labels from label stock spliced in accordance with the present invention is readily accomplished as only the casted film contacts the splicing tape extending across the release backing, and this film readily releases from its substrate so that after diecutting labels from the stock, the unused portions of the label layer can be separated from the backing without the web tending to snap.

In a modified form of the present invention, two thin sheets of foil, a paper or any other thin substrate are used as the insert member. In a still further embodiment of the present invention, a silicone-coated sheet is used as the insert member.

DRAWINGS

FIG. 1 is a plan view of label stock which has been die-cut.
FIG. 2 is a cross section taken on line II—II of FIG. 1.
FIG. 3 is a cross section similar to FIG. 1 illustrating removal of the label stock matrix.
FIG. 4 is a cross section showing a label being dispensed as in a conventional knife edge label dispenser.
FIG. 5 is a cross section of a modification in accordance with the present invention.

DETAILED DESCRIPTION

Figure 1:
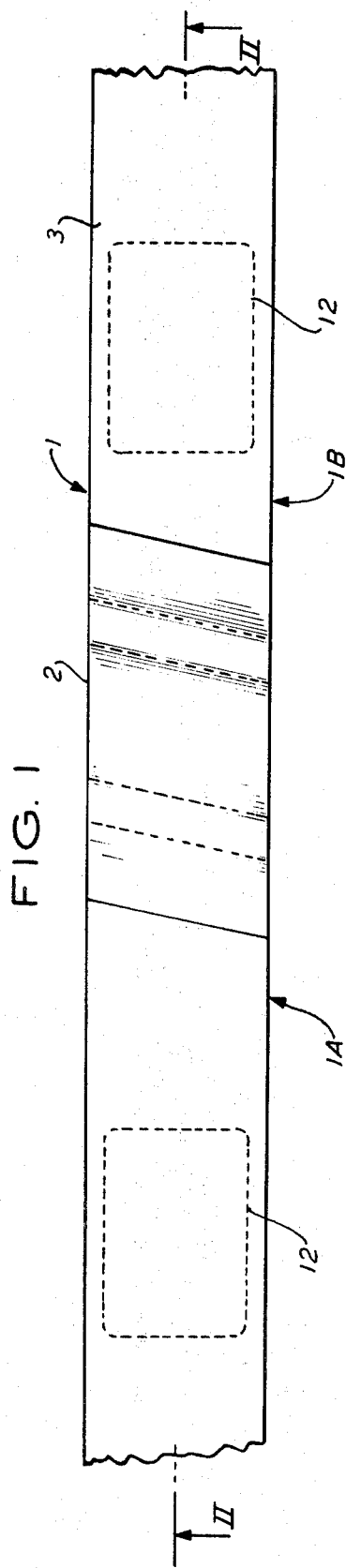
Figure 2:
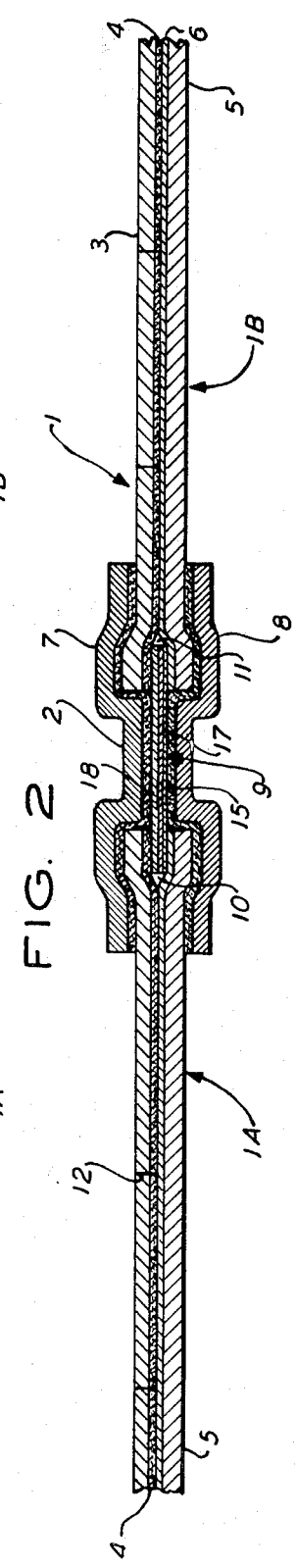

Labels are conventionally manufactured from label stock such as that shown, generally, at 1, in FIGS. 1 and 2. Stock 1 is shown split and spliced together in accordance with the present invention as indicated generally at 2. It is to be understood that while stock 1 is referred to as label stock, it is meant to represent any substrate to which pressure-sensitive adhesives are conventionally applied such as, tape stock, poster stock, etc.

Stock 1 includes a layer 3 capable or receiving printing and adapted to form the face of a label. Layer 3 has adhered thereto a layer of pressure-sensitive adhesive 4. Adhesive 4 is protected by a release backing 5 coated with a release material 6 such that the adhesive is united weakly to the backing 5.

Layer 3 may comprise cloth, plastic or any grade of paper conventionally used in label manufacture, and generally, it is a highly finished book paper. Adhesive 4 is any conventional pressure-sensitive adhesive.

Release backing 5 is comprised of paper, preferably of the kraft type. Release material 6, which is in contact with adhesive 4, may comprise any conventional release material such as nitrocellulose, cellulose triacetate, silicone or any other conventional release material for pressure sensitive adhesives.

The spliced section 2 comprises splicing tapes 7 and 8 applied to layer 3 and backing 5 thereby interconnecting the two stock sections 1A and 1B. An insert member 9, having end portions 10 and 11 sandwiched between the adhesive and release coat of the sections 1A and 1B, prevents the splicing tapes from fusing and permanently bonding the label layer 3 to the release backing 5.

Figure 3:
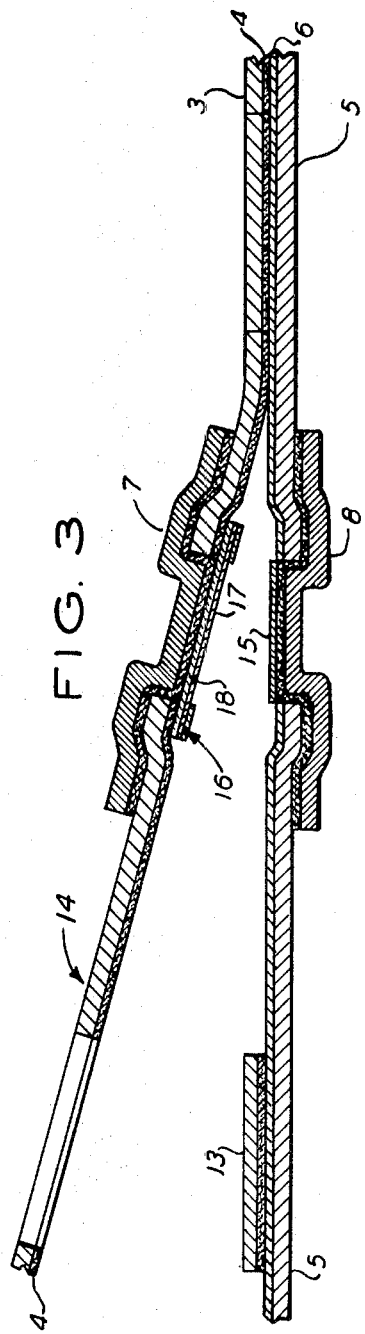

Stock 1 is adapted to be printed and then die-cut, as indicated at 12, with the dies adjusted to cut through layer 3 and adhesive 4 but not through the release backing 5. After diecutting, and as illustrated in FIG. 3, the unused portions of layer 3, commonly referred to as the matrix, is stripped off. In this way, a series of labels 13 are formed in spaced relation along release backing 5 which serves as a carrier.

As illustrated in FIG. 3, the matrix 14 readily removes in the area of splice 2. Splice 2 includes a strippable film 15 which is adhered to a supporting substrate 16 with the same degree of tack as adhesive 4 has for release layer 6. Accordingly, no extra force is required to separate the matrix 14 in the spliced area.

Supporting substrate 16 of insert 9 may comprise polyethylene or other suitable plastic upon which a film may be releasably cast. It is preferable that the substrate 16 include a release layer 17 coated on any suitable base sheet of paper or plastic 18. The release layer may be comprised of any suitable release material such as nitrocellulose, cellulose triacetate, silicone or any other conventional release material.

Strippable film 15 may be formed from any film forming material such as polystyrene, polyvinyl alcohol, polyvinyl acetate, ethyl cellulose, cellulose acetate, cellulose acetate butyrate, polyethylene etc.

While not critical, it is preferred that a minimum bulge be provided in the area of splice 2. Accordingly, it is preferred to keep the thickness of strippable film 15 to a minimum thickness. When kept to a minimum thickness, the film is weak and only the portion adjacent the splicing tape adhesive breaks away from the remainder of the film. In this instance, it is preferred that the film be metallized or otherwise colored so that a visible check can be made to determine whether the film has completely broken away in the area of the splicing tape adhesive.

In view of the foregoing, it can be seen that matrix 14 can be removed under high-speed conditions without fear of a break. In addition, there is no requirement for obtaining perfect abutment of the stock edge portions to be joined. Still further splicing tape 7, extending across the layer 3, may be omitted if adhesive 4 is of the permanent type as the base 18 of the insert member would then serve an equivalent purpose.

It is to be noted that strippable film 15 may be eliminated. Provided release layer 17 adheres to the adhesive on the splicing tape 8 with the same degree of tack as adhesive 4 bears to release layer 6, then fusion of the splicing tapes is prevented and the matrix may be readily removed. While this will serve some applications, it is subject to the disadvantage of leaving the adhesive on the splicing tape 8 active thereby causing problems when the stock is rolled for dispensing purposes. In view of this latter limitation, it is preferred to use the strippable film 15 so that the splicing tape adhesive is made inactive.

Figure 4:
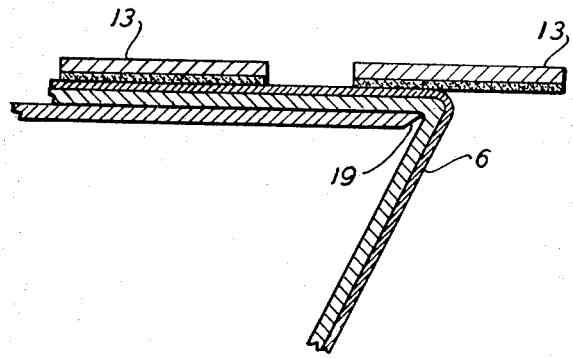

Fig. 4 shows a label being dispensed from a roll of labels 13 such as might be manufactured are hereinbefore described. The bond between adhesive 4 and release material 6 is relatively weak and thus, when the roll of labels is made to bend back sharply, as is typically accomplished in a label-dispensing device represented by knife edge 19, the labels 13 peel away from the release material and dispense.

In order to avoid the release backing 5 peeling off the splicing tape 8 in a label dispenser as illustrated in FIG. 4, the adhesive on the splicing tape 8 should provide sufficient bond to the release backing 5 so as to overcome any tendency for the backing 5 to peel off. In addition, in order to minimize the peel away effect, the splice is angled relative to the edges of the stock as shown in FIG. 1.

Figure 5:
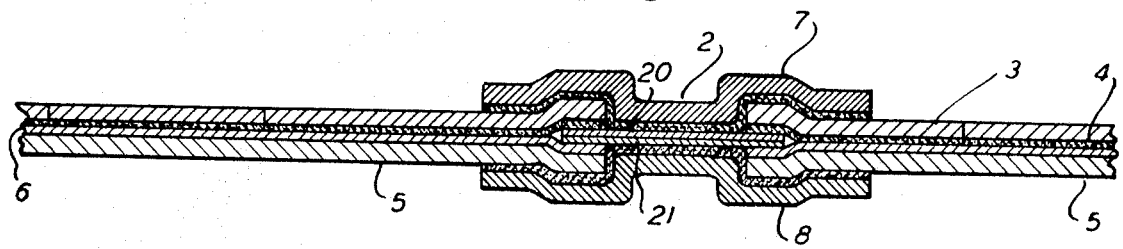

Referring to FIG. 5, a modification of the present invention is shown which is identical to the embodiment hereinbefore described, except that two separate pieces of metal foil 20 and 21 are substituted for the strippable film insert member as hereinbefore described. In this instance, the one layer of foil 20 peels off with the matrix 14 while the second layer 21 stays with the release backing 5 having the labels thereon. It is to be understood that paper or plastic sheets or the like could be substituted for the foil.

The foregoing is considered illustrative only of the principles of the invention. Since numerous modifications and changes will readily occur to those skilled in the art, it is not desired to limit the invention to the exact construction and operation shown and described, and accordingly all suitable modifications and equivalents may be resorted to as falls within the scope of the appended claims.

What is claimed is:

1. The combination comprising first and second sections, each of said sections including a pressure-sensitive adhesive layer and a release layer adjacent said pressure sensitive adhesive, a member extending between said first and second sections having end portions sandwiched between the pressure sensitive adhesive layer and the release layer of each of said sections, a first tape overlapping and adhered to portions of said first and second sections and said member, a second tape opposite said first tap overlapping and adhered to portions of said first and second sections and said member.

2. The combination as defined by claim 1, said member comprising a two layered structure, one of said layers being separable from the other of said layers.

3. The combination as defined by claim 1, said member comprising two separate sheets of material.

4. The combination as defined by claim 1, said member comprising a sheet of material, a release layer on one surface of said sheet of material.